Jan. 17, 1956     R. S. KELBERT ET AL     2,730,860
TIMEPIECE FOR AUTOMOTIVE VEHICLE
Filed March 17, 1953
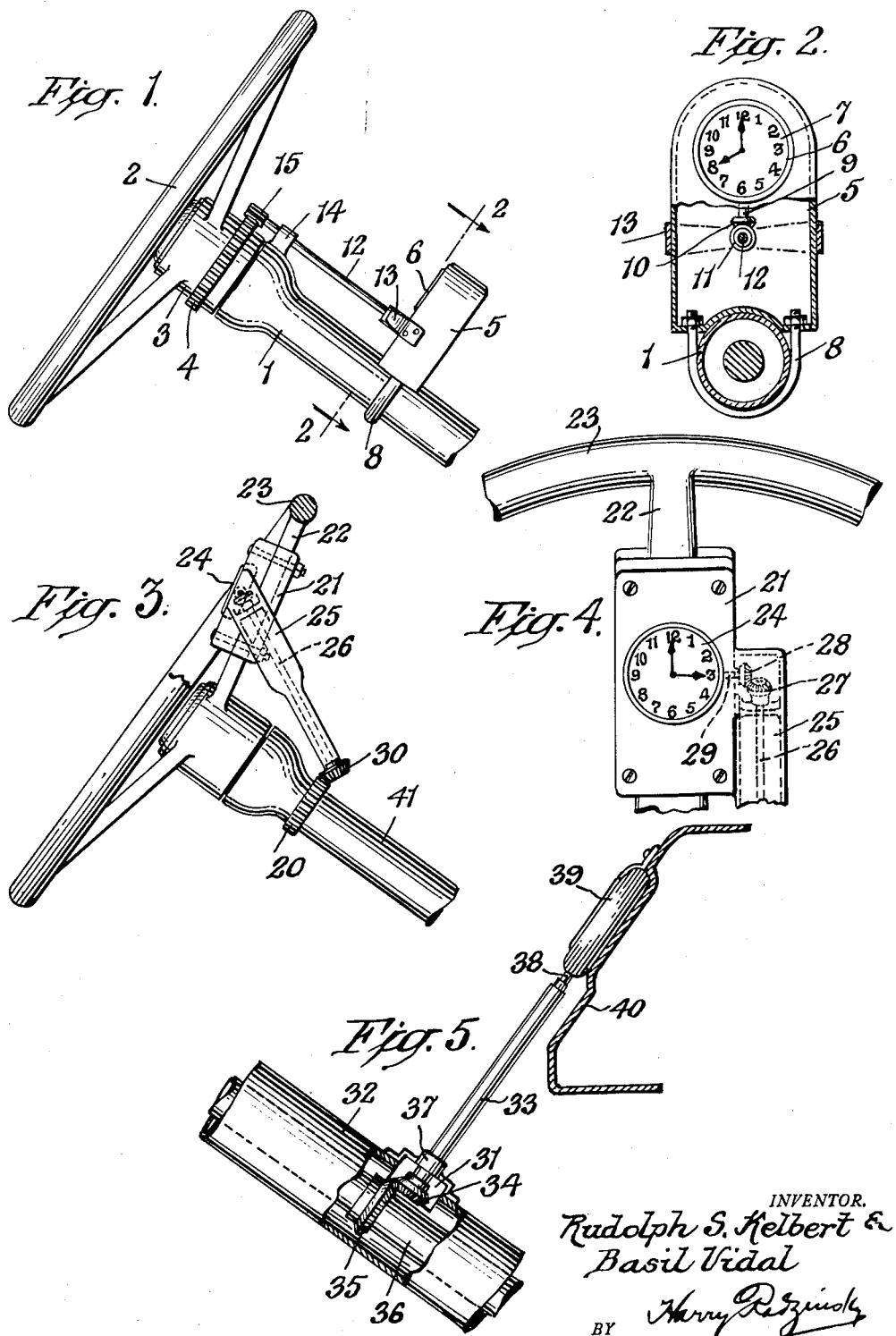
INVENTOR.
Rudolph S. Kelbert &
Basil Vidal
BY Harry Pedzinsky
ATTORNEY

United States Patent Office 2,730,860
Patented Jan. 17, 1956

2,730,860
TIMEPIECE FOR AUTOMOTIVE VEHICLE

Rudolph S. Kelbert and Basil Vidal, New York, N. Y.

Application March 17, 1953, Serial No. 342,806

4 Claims. (Cl. 58—46)

This invention relates to timepieces, and particularly to those intended for use on automobiles or other automotive vehicles. It is an object of the present invention to provide a timepiece having a winding mechanism which will be positively operated by movements of the steering wheel or other controlling elements of the vehicle.

I am aware that prior to the present invention, efforts have been made to wind watches, clocks or other timepieces by movements of the steering wheel of a vehicle. However, in each instance when this has been attempted, the winding mechanism included one or more oscillating weights or pendulums which were caused to be set in movement by operation of the steering wheel. Such mechanisms were found to be uncertain, erratic and undependable, since a definite and positive drive of the winding apparatus from the steering wheel to the winding mechanism of the timepiece was not assured.

It is therefore an object of the present invention to provide a winding means for a timepiece which will be positively driven or operated by gearing means extending between the steering wheel or from other movable part of the steering apparatus, by means of which the winding stem of the timepiece will be definitely and positively rotated upon each movement of said part of the steering apparatus.

With these and other objects to be hereinafter disclosed in view, we have devised the arrangement of parts to be described and more particularly pointed out in the claims appended hereto.

In the accompanying drawing, wherein several illustrative embodiments of the invention are disclosed, Fig. 1 is a side elevation showing a part of the steering mechanism of an automotive vehicle to which the present invention has been applied;

Fig. 2 is a sectional view taken substantially on the line 2—2 of Fig. 1, looking in the direction of the arrows;

Fig. 3 is a side elevation of a modified structure, with parts shown in section, and with other parts broken away, to disclose construction;

Fig. 4 is a front elevational view of the structure of Fig. 3, and

Fig. 5 is a side elevation, with parts in section, of another embodiment of the invention.

Referring to the drawing, and more partciularly to Figs. 1 and 2 thereof, 1 indicates the steering post of an automobile or other motor vehicle. Mounted for conventional rotative movement at the top of the steering post 1 is the usual steering wheel 2 having a hub 3 which is, of course, rotative with the wheel 2. Secured upon the hub 3 below the steering wheel 2, is a ring gear 4 which can be composed of two or more segments to facilitate its securement on the hub 3.

At 5 is shown a housing or casing in which is mounted a timepiece 6 having its face or dial 7 exposed through an opening in the housing, said dial or face 7 being directed toward the steering wheel so that the same will be readily visible to a person seated behind the wheel. The casing or housing 5 may be secured to the steering post 1 by any suitable mounting means, such as by the U-bolt 8, to firmly hold the casing in position. The timepiece 6 is provided with a winding stem 9 on which a bevel gear 10 is secured. Said bevel gear 10 is in constant mesh with a bevel gear 11 secured on one end of a driving shaft 12 rotatively supported adjacent to one end in a bracket 13 secured to the housing 5. An additional support for the shaft may be in the form of a bearing 14 mounted on the steering post 1. On the upper end of the driving shaft 12 is provided a pinion 15 which is in constant mesh with the ring gear 4.

From the foregoing, the operation of the described device will be readily understood. Each time that the steering wheel is rotated, as in the operation of the steering of the vehicle of which it forms a part, the ring gear 4 will be rotated and this will rotate shaft 12 through the medium of the pinion 15. Rotation of the shaft 12 will result in the winding stem 9 being rotated through the bevel gears 10 and 11 and hence the timepiece will be quickly and positively wound with relatively little operation of the motor vehicle.

In order to prevent overwinding of the timepiece, the same is of such construction that when it is fully wound, release or slippage of the winding mechanism occurs. This is known construction and is at present embodied in several known types of watches. It will therefore be apparent that by the use of a timepiece of such construction winding may take place by the movements of the steering wheel without causing damage to the mechanism of the timepiece.

In the embodiment of the invention shown in Figs. 3 and 4, a ring gear 20 is non-rotatively secured upon the steering post housing 41. A casing 21 is secured on one of the spokes 22 of the steering wheel 23. Said casing holds a timepiece 24 which has its dial exposed and directed toward the operator of the vehicle, as is clearly shown in Fig. 4. The casing 21 is provided with a tubular downward extension 25 in which a driving shaft 26 is rotatively supported. On the upper end of the driving shaft is secured a bevel gear 27 in mesh with a bevel gear 28 secured on the end of the winding shaft 29 of the timepiece 24. On the lower end of the driving shaft 26 is secured a pinion 30 which is in mesh with the ring gear 20. In this embodiment of the invention, rotation of the steering wheel 23 will cause the casing 21 and shaft 26 to be carried around with the wheel and this will cause pinion 30 to be rotated around the ring gear 20. The rotation of the pinion 30 will thus rotate the shaft 26 which will wind the timepiece winding mechanism through rotation of the winding shaft 29.

In this embodiment of the invention the timepiece is, of course, provided with an overwinding means as mentioned with respect to the embodiment shown in Figs. 1 and 2.

In the two embodiments thus far described, the shape and arrangement of the housings 5 and 21 within which the timepieces are mounted are illustrative, since these housings may be made in various ways and attached to the parts on which they are shown as being mounted by means other than those disclosed without departing from the spirit of the invention.

It is also to be noted that in the structures thus far described, certain operating parts, such as the pinion 15 and gear 4, as well as the pinion 30 and gear 20, are exposed to view. It will be understood that these parts can be covered or enclosed in a suitable protective housing to thereby fully conceal and protect the same, or to prevent the hands or clothing of the car operator from being damaged by these parts while in motion.

In the embodiment of the invention shown in Fig. 5, an opening 31 is provided in the steering post housing 32 to permit of the entry of one end of the driving shaft 33. Said shaft is provided at one end with the bevel gear 34 which meshes with a bevel gear 35 secured on the steering post shaft 36 within the housing 32. The driving shaft 33 may be supported in any suitable manner, such as for example by a bearing 37 secured to the steering post housing 32. At its opposite end the driving shaft 33 is coupled, and possibly by a flexible coupling, to the winding stem 38 of a timepiece 39 secured to the instrument panel 40 or to some other suitably-positioned, fixed element on the vehicle and convenient to the operator. With this arrangement, it will be apparent that any turning movement applied to the steering post shaft 36 will rotate the bevel gear 35 to cause rotation of the gear 34 and hence rotation of the shaft 33 and winding stem 38, resulting in the winding of the timepiece.

In the several embodiments of the invention described, the winding of the timepiece is attained by such normal turning movements of the steering wheel as take place in controlling the steering of the car. The drive between the movable element of the steering gear and the winding stem of the timepiece is a positive one and as a result the winding operation is performed with certainty. The operation of the car for a relatively short distance will insure winding of the timepiece to an extent to enable it to operate for an eight-day period.

While I have described several embodiments of the invention, it will be apparent that modifications may be made therein without departing from the scope of the invention as comprehended by the claims appended hereto. For example, all operating parts of the device may be housed in a suitable casing; instead of gearing being used for establishing a driving connection between the steering gear element and the timepiece, a suitable friction drive might be used. The location of the timepiece might be other than that disclosed, and for example, might be located at the center of the wheel where the horn button is now usually located. These and other modifications might readily be made without materially changing the principles of operation herein disclosed.

What I claim is:

1. A device of the character described comprising, a steering post including an inner rotative shaft and including a housing surrounding the shaft, a gear fixed on the rotative shaft, the housing being apertured adjacent to said gear, an instrument panel, a timepiece secured thereon, said timepiece having a winding shaft, and a drive shaft extending between the gear on the rotative shaft and the winding shaft, said drive shaft carrying a gear at one end for mesh with the gear an the rotative shaft, the other end of the drive shaft being connected to the winding shaft.

2. A device of the character described comprising, an automobile instrument panel, a timepiece carried thereby, said timepiece having a winding stem, a steering post having an inner rotative shaft, said steering post including a housing surrounding the shaft, a gear fixed on the rotative shaft within the housing, the housing being apertured adjacent to said gear, a drive shaft extending between the winding stem of the timepiece on the instrument panel remote from the steering post to the gear, said drive shaft having an end entering the aperture in the housing and means at the opposite ends of the drive shaft for establishing a driving connection by means of said shaft, between the gear and winding stem.

3. A device of the character described comprising, an automobile instrument panel, a timepiece carried thereby and positioned remotely from the steering wheel of the car, said timepiece having a winding stem, a steering post carrying the said steering wheel and having an inner rotative shaft that is rotated when the steering wheel is turned, said steering post including a housing enclosing the shaft, said housing being provided with an opening, a driving shaft having an end entering said opening and carrying a gear on its end located within the housing, a gear mounted on the steering post shaft and in mesh with the first-mentioned gear, and a coupling between the second end of the driving shaft and the winding stem whereby rotation of the steering post shaft will rotate the winding stem.

4. A device of the character described comprising, an automobile instrument panel, a timepiece carried thereby and positioned remotely from the steering wheel of the car, said timepiece having a winding stem, a steering post carrying the said steering wheel and having an inner rotative shaft that is rotated when the steering wheel is turned, the steering post including a housing enclosing the shaft, said housing being provided with an opening, a driving shaft having an end entering said opening and carrying a driving element on its end located within the housing, a co-operative driving element carried by the steering post shaft and driving with the first-mentioned gear, and a coupling between the second end of the driving shaft and the winding stem whereby rotation of the steering post shaft will rotate the winding stem.

References Cited in the file of this patent

UNITED STATES PATENTS

| | | |
|---|---|---|
| 1,946,890 | Whitehead et al. | Feb. 13, 1934 |
| 2,176,278 | Shaker | Oct. 17, 1939 |
| 2,647,361 | Goodman | Aug. 4, 1953 |